July 28, 1970

EIZO GOTO 3,522,027

METHOD AND APPARATUS FOR SEALING WITH GLASS PORTIONS TO BE SEALED

Filed Feb. 23, 1967

United States Patent Office 3,522,027
Patented July 28, 1970

3,522,027
METHOD AND APPARATUS FOR SEALING WITH GLASS PORTIONS TO BE SEALED
Eizo Goto, Chigasaki-shi, Japan, assignor to Tokyo Shibaura Electric Co., Ltd., Kawasaki-shi, Japan, a corporation of Japan
Filed Feb. 23, 1967, Ser. No. 617,948
Claims priority, application Japan, Feb. 28, 1966, 41/11,694; Oct. 7, 1966, 41/65,607; Oct. 27, 1966, 41/70,421; Oct. 31, 1966, 41/71,623; Dec. 9, 1966, 41/80,322; Jan. 9, 1967, 42/1,399
Int. Cl. C03c 27/06
U.S. Cl. 65—40                                   14 Claims

ABSTRACT OF THE DISCLOSURE

A method and apparatus for sealing wherein sealing glass is fused by heat, an electric current is passed through the molten glass to heat it to a desired viscosity, and portions to be sealed of an article are successively dipped in said molten glass by rotating the article whereby all said portions are sealed by the molten glass adhering thereto.

---

Figure 1:
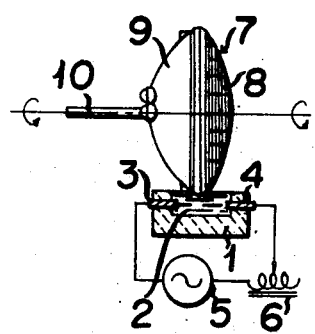

This invention relates to seal with glass portions to be sealed and more particularly to a method and apparatus for sealing with glass by immersing openings or contact portions into molten glass, withdrawing them therefrom and causing the molten glass to solidify whereby to provide air tight and strong seals at these portions.

Articles having sealed portions such as sealed beam lamps, Braun tubes, incandescent lamps, fluorescent lamps or articles having air tight internal portions such as vacuum bottles are usually made of glass. According to the simplest method, these sealed portions are sealed by being fused by a flame of a burner.

While the apparatus utilized to seal by a burner is very simple, it is difficult to provide at a high efficiency seals of uniform quality because sealed portions are liable to be deformed by the action of fusion and because the sealing operation requires a considerably long time. Further, use of burners accompanies contamination of factory atmosphere due to the burning of gas as well as hazard caused by flame and heat.

It is well known in the art to heat glass portions to be sealed by passing an electric current through them whereby to fuse and seal these portions. However, the property of glass is usually such that it is an electric non-conductor at room temperature but rapidly increases its conductivity when fused at an elevated temperature so that it is necessary to preheat the seals to an extent to enable heating by an electric current. Where the seals are preheated by means of a gas burner, for instance, and are then caused to fuse by the heat generated by an electric current passed through the seals it is very difficult to preheat the entire portion of seals to a uniform temperature because of low heat conductivity of glass. As a consequence, portions at higher temperatures are effectively heated by electric current and hence fused rapidly whereas portions at lower temperatures are difficult to heat by the flow of electric current. Thus some of the seal portions will be well fused while the other not well, thus hindering to obtain seals of uniform quality. Further, if a current path were formed at portions other than the sealed portion by any reason the majority of current supplied for the purpose of fusion would be by-passed around the seal, thus resulting in insufficient fusion of the seal. Accordingly, such a method of heating by electric current can not be used to join glass and a material having higher electric conductivity than glass, metal, for example.

There is also a method wherein a bonding agent is used for providing seals. However, the thermal characteristics of a common bonding agent, for example, a synthetic resin, is far inferior to that of glass. Further, as is well known in the art, as the air tightness of such a bonding agent is not sufficient, it is impossible to use such bonding agent to seal articles including air tight portions subject to a pressure different from the atmospheric pressure.

One of the objects of this invention is to provide a novel method of sealing capable of readily forming seals of good air tightness in a short time by adhering molten glass to sealed portions.

A further object of this invention is to provide a novel method which can form uniform seal over the entire portion by always maintaining constant the viscosity of molten glass to be adhered to sealed portions.

A still further object of this invention is to provide a novel method capable of providing an intimate and strong bond between the sealed portion and the molten glass by performing the sealing operation in a temperature controlled atmosphere.

Yet another object of this invention is to provide a novel method capable of forming seals of definite configuration by controlling the configuration of the molten glass adhering to the sealed portion.

Another object of this invention is to provide a method capable of providing an air tight seal between glass and a member of a material other than glass.

A further object of this invention is to provide a novel apparatus to be used for carrying out said method.

This invention contemplates to provide a method of sealing with glass portions to be sealed comprising the steps of fusing glass, establishing an electric current path through said molten glass to heat the same and rotating an article including seals so that they are successively dipped into and withdrawn from the molten glass through which the current path has been established, and apparatus utilized for carrying out the method into practice.

Sealing is effected by a layer of glass which has solidified after adhesion to the portions to be sealed. The glass layer will be caused to adhere to the entire surface of the predetermined portion to be sealed by the movement thereof as the article is rotated. The glass adapted to form the glass layer is fused and since the molten glass is heated to have a desired viscosity by an electric current flowing through the molten glass will intimately and evenly be adhered to the entire portions to be sealed which are dipped in the molten glass. As a consequence, effective seals with glass can be provided not only where the whole portion to be sealed is made of glass but also where it is of a material other than glass, for example, metal.

Figure 2:
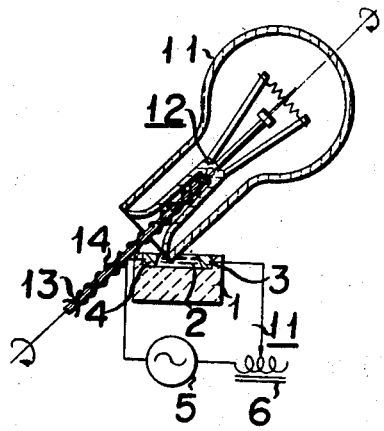
Figure 3:
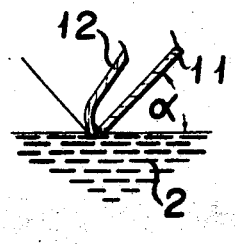
Figure 4:
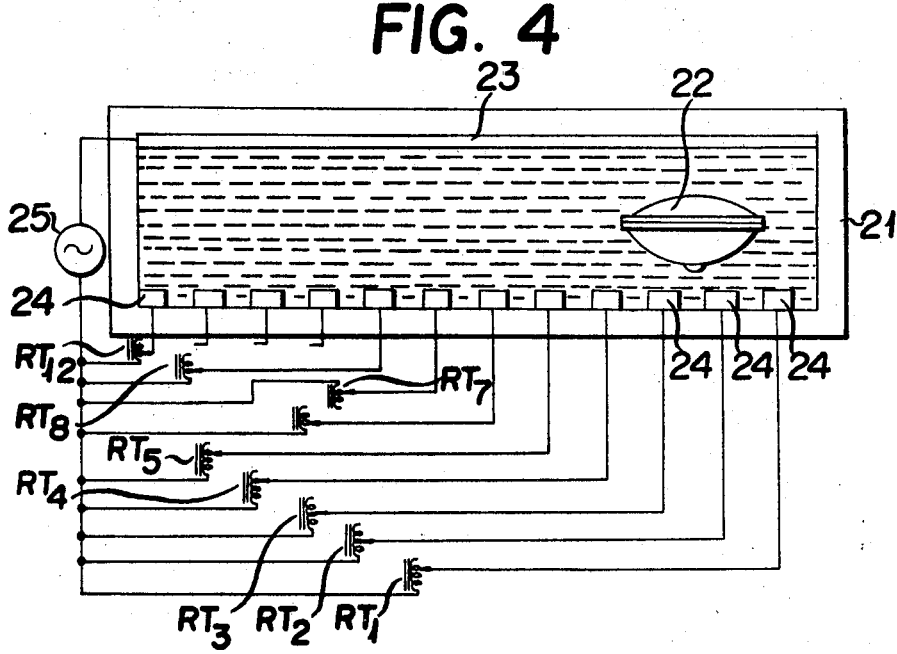
Figure 5:
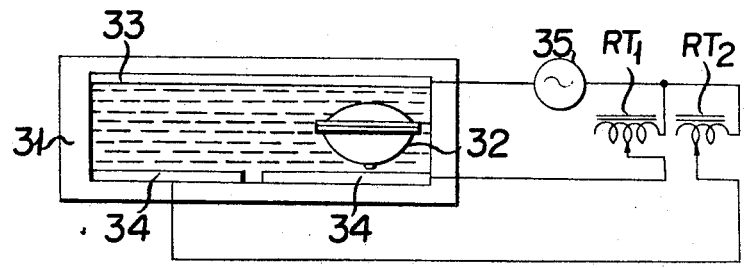
Figure 6A:
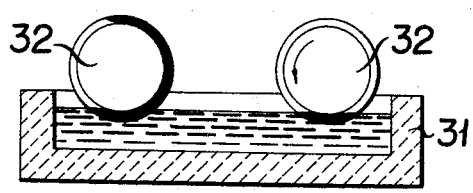
Figure 6B:
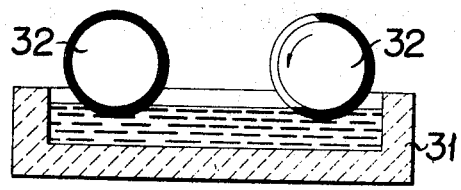
Figure 7:
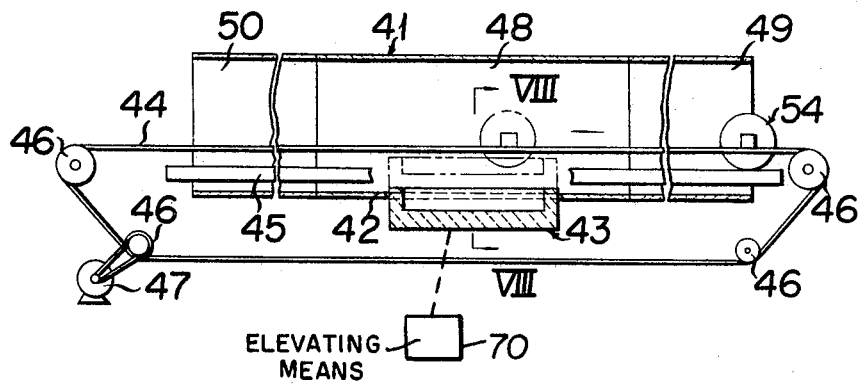
Figure 8:
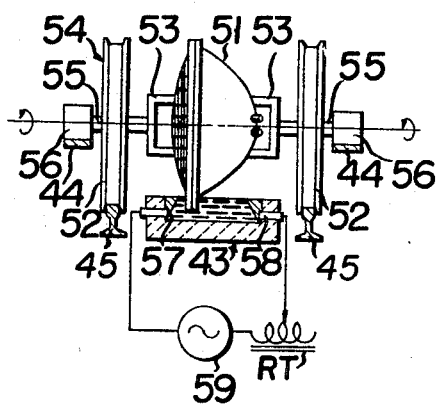
Figure 9:
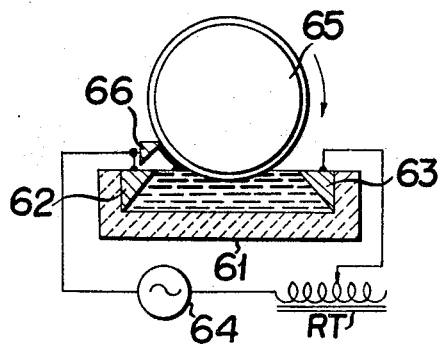
Figure 10:
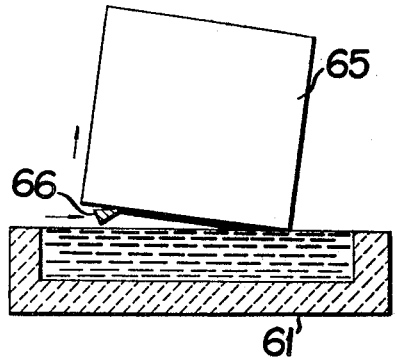

In the accompanying drawings:
FIG. 1 shows a longitudinal section of a sealing apparatus embodying this invention and the associated electric circuit;
FIG. 2 shows a side elevation, partly in section, of a modified sealing apparatus;
FIG. 3 is an enlarged partial view showing the manner of contact between portions to be sealed and molten glass;
FIG. 4 is a plan view of a further modification of the sealing apparatus and its associated electric circuit;
FIG. 5 is ia similar view of another modification;
FIGS. 6a and 6b are sectional views to explain the order of dipping the portions to be sealed in the molten glass in the apparatus shown in FIG. 5;
FIG. 7 is a sectional view of a still further modification;
FIG. 8 is a sectional view taken along a line VIII—VIII in FIG. 7; and
FIGS. 9 and 10 show sectional views of another modification of this invention.

Referring now to the accompanying drawings, FIG. 1 illustrates a sealing apparatus utilized to seal portions to be sealed of a sealed beam lamp. A tank 1 made of a suitable refractory material is filled with molten glass which is heated to a temperature at which sufficient fluidity by external heating means is assured. A pair of electrodes of non-fusible metal such as tungsten, molybdenum and the like or carbon are disposed to penetrate through side walls of the tank 1 at a level below the liquid surface of the molten glass, one of the electrodes 3 being connected to one terminal of a source of supply 5 whereas the other electrode 4 to the other terminal of the source via a variable impedance of a variable stabilizer 6.

When a voltage is impressed between terminals 3 and 4 from the source of supply 5, a current will flow from one terminal to the other through the molten glass to increase the temperature thereof. Where the molten glass consists of soda-lime glass, by applying an alternating current of 50 cycles per second across the electrodes 3 and 4 it is possible to increase the temperature to 1400 to 1500° C. the viscosity of the molten glass at this temperature being about 100 poises.

Portions to be sealed of a sealed beam lamp 7 are dipped in the body of the molten glass 2. As shown in FIG. 1, the sealed beam lamp 7 comprises a bowl-shaped lens portion 8 of transparent glass and a bowl-shaped reflector portion 9 made of glass having a reflecting film deposited on the inner surface thereof. To the back of the reflector portion 9 is connected an exhaust tube 10 adapted to evacuate the interior of the lamp after sealing. The lens portion 8 and the reflector portion 9 are aligned to maintain a predetermined relative position and the assembly is held by a suitable holding mechanism, not shown, that can rotate the assembly around the axis thereof. The holding mechanism operates to move portions to be sealed of the lamp 7 successively into the molten glass 2 while rotating the lamp 7 at a low speed.

Molten glass which has been heated to have sufficient fluidity adheres to portions to be sealed which are dipped in the body of the molten glass, and as these portions are moved by the rotation of the lamp 7 a glass layer having a suitable thickness will be formed over the entire portions to be sealed. Sealing operation is completed during one complete revolution of the sealed beam lamp 7 while its portions to be sealed are held immersed in the molten glass. However, if desired, the portions to be sealed may be dipped twice or more times.

Generally stated, the temperature of portions to be sealed and to be dipped in the molten glass is lower than the temperature of the molten glass. Consequently, portions of the molten glass which come into contact with the portions to be sealed are rapidly cooled to increase viscosity. However, since electric current supplied through the electrodes are flowing through these portions of molten glass, cooled molten glass will be heated by the Joule heat provided by the current to compensate a temperature drop thus maintaining the viscosity at the desired value. Decrease in the temperature of the molten glass contributes to heat portions to be sealed to improve wettability of these portions against molten glass thus ensuring intimate and uniform adhesion of the molten glass to the portions to be sealed.

FIG. 2 shows a modification of this invention by which a seal is provided between a glass globe or bulb 11 of an incandescent lamp and a mount 12. The step of the mount is of the flared type with its flared portion positioned close to the neck of the glass globe 11 to form portions to be sealed. The mount 12 is provided with an exhaust pipe 13 and lead-in conductors 14 both extending in the direction opposite to the glass globe 11.

The tank 1 containing molten glass is substantially the same as that shown in FIG. 1 except electrodes 3 and 4. Thus, portions corresponding to those of FIG. 1 are designated by the same reference numerals and their description is omitted. The axis of the mount 12 is inclined with respect to the liquid level of the molten glass so that portions to be sealed are successively brought into contact with the molten glass 2. The glass globe 11 and the mount 12 are held at this desired angle by means of an appropriate holding mechanism, not shown, and are rotated at a low speed as in the previous embodiment. As best shown in FIG. 3, the open end of the glass globe 11 and the lower end of the mount 12 are simultaneously immersed in the molten glass so that these portions will be sealed with glass as above described. In this case the sealing operation is not interfered by the exhaust pipe 13 and the lead-in conductors 14 which extend from the tip of the mount in the direction opposite to the glass globe 11.

A glass globe consisting of soda-lime glass having a thermal expansion coefficient of $9.8 \times 10^{-6}$ cm./cm./° C, a softening temperature of 620° C. and a diameter of 22.5 mm. at the opening, a wall thickness of 2.5 mm., and a stem of a mount consisting of the same soda-lime glass and having a diameter of 18 mm. at the opening and a wall thickness of 0.8 mm. were sealed by dipping their portions to be sealed in a molten glass of a low melting point having a thermal expansion coefficient of $9.1 \times 10^{-6}$ cm./cm./° C. and a softening temperature of 570° C. The result of this experiment showed that a highly air tight and strong seal could be completed in 8 seconds. In this experiment the molten glass was heated to a temperature of 1300 to 1400° C. by a current of the density of $2.5/cm.^2$ which was supplied by a pair of molybdenum electrodes and the glass globe and the mount supported at an angle of about 30° with respect to the liquid level were rotated through one complete revolution.

When rotating an article including portions to be sealed, by effecting a relative movement between the article and the molten glass in the direction parallel to the liquid level, more satisfactory sealing can be formed. This is because portions to be sealed which are successively immersed in the molten glass come into contact with new molten glass, thus the temperature thereof has not been lowered by the contact with portions to be sealed.

FIG. 4 shows a tank designed to permit an article including portions to be sealed to move in the dircetion parallel to the liquid level of the molten glass. The configuration of the tank is of an elongated rectangle, the length of its wider side being somewhat longer than the peripheral length of the sealed portion of the article, for example, a sealed beam lamp. On one of the opposed inner surfaces of the wider sides of the tank 21 is mounted a coextensive electrode 23 and a plurality (for Example 12) of closely spaced electrodes 24 are provided on the opposite side wall. One electrode 23 is connected to one terminal of a suitable source of supply 25 while the other twelve electrodes 24 to the other terminal of the source through respective variable reactors RT.

The tank 21 is filled with molten glass which is heated by electric current flowing through it between the electrode 23 and the divided electrodes 24 to have a viscosity suitable for sealing, for example, from 50 to 100 poises. Uneven local heating of the molten glass contained in the tank 1 can be precluded by the variable reactor RT connected to the particular electrode.

The sealed beam lamp 22 to be sealed is held by means of a suitable holding mechanism (not shown) designed to rotate the lamp about its axis and to move it in the longitudinal direction of the tank 21, at first, portions to be sealed of the lamp are dipped in the molten glass at a portion close to one of narrower sides of the tank. Then while rotating, the lamp is moved toward the opposite side of the tank 21 at a speed substantially equal to the peripheral speed of the sealed portion. After completion of one revolution, the lamp is withdrawn from the molten glass.

FIG. 5 illustrates a modified apparatus wherein an article including portions to be sealed is moved in the direction parallel to the liquid level of the molten glass while rotating. In this modification the length of the tank 31 is about one-half of the peripheral length of the portions to be sealed of an article, for instance, a sealed beam lamp 32. As before, one wider side of the tank is provided with an electrode coextensive therewith and the other side two divided electrodes 34, said longer electrode 33 being connected to one terminal of a suitable source of supply 35 whereas divided electrodes 34 to the opposite terminal of the source through respective reactor RT.

The molten glass contained in the tank 31 to submerge therein electrodes 33 and 34 is heated to a desired uniform temperature by an electric current supplied thereto from the source 35 via variable reactors RT, as in the same manner as in the previous embodiments. At first, portions to be sealed of the sealed beam lamp 32 are dipped in the molten glass at a portion close to one of the narrower sides of the tank 31. Again, the sealed beam lamp is held by a holding mechanism, not shown, that can move it in the longitudinal direction and in parallel with the liquid level of the molten glass while rotating the lamp. As shown in FIG. 6a, the sealed beam lamp is brought to the opposite side of the tank when about one-half of the portions to be sealed have been dipped in the body of the molten glass. At this point, the lamp is withdrawn from the molten glass, returned to the original starting position without any rotation and again lowered to be immersed in the molten glass. Thereafter, as shown in FIG. 6b, rotation and movement are again repeated to complete sealing of remaining portions.

In this case, the length of the tank 31 can be reduced to about one half of that shown in FIG. 4 thus reducing the physical size of the apparatus and enabling easy control of the molten glass.

In the embodiments shown in FIGS. 4 to 6 the relative movement between an article including portions to be sealed and the molten glass can also be effected by the movement of the tank containing the molten glass.

FIGS. 7 and 8 indicate an apparatus capable of effecting continuous sealing in accordance with this invention. At the bottom of an elongated tunnel shaped furnace 41, there is provided an opening 42 through which a tank 43 adapted to contain the molten glass is elevated and lowered by means of a suitable elevator mechanism, not shown. A pair of endless conveyers 44 and a pair of rails 45 are provided in the furnace 41. Conveyers 44 run about a plurality of pulleys 46 so as to move along a definite path, which are driven by a driving source 47, such as an electric motor. Suitable heating means are mounted in the furnace 41 to define a sealing region 48 of the highest temperature at the center, a preheating region 49 of lower temperature at the entrance of the furnace and a slow cooling region 50, also of lower temperature than the sealing region at the exit portion of the furnace.

As best shown in FIG. 8, a sealed beam lamp 51 including portions to be sealed is supported by a holding mechanism 53 provided between a pair of wheels, and the assembly 54 is mounted on a movable carriage such that wheels 52 rest on respective rails 45. Further rollers 56 mounted on the outer ends of the shafts 55 of the wheels 52 are arranged to cooperate with conveyers so that the assembly 54 will be rotated and moved along rails as the conveyers run. When the assembly reaches a position above the molten glass contained in the tank 43 as it is moved from the entrance toward the exit of the furnace 41, the tank 43 will be elevated by means of an elevating mechanism 70 to a position (shown by dotted lines) to immerse portions to be sealed of the assembly 54 and again lowered to the original position when the assembly reaches the other end of the tank 43. Elevating mechanism 70 is shown only in block form. The particular design thereof should be apparent to those skilled in the art.

The length of the tank 43 is slightly longer than the peripheral length of the seal of the sealed beam lamp 51 and one of the wider sides of the tank is provided with a coextensive electrode 57 whereas the other side has divided electrodes 58, the longer electrode 57 being connected to one terminal of a source of supply 59 while the divided electrodes 58 to the opposite terminal thereof, respectively, through variable reactors RT.

It is to be noted that contact portions of wheels 52 of the assembly should have substantially the same configuration and dimension as those of the seal. With such a construction, as the center of rotation of the assembly 54 moves in the vertical direction in accordance with the configuration of the seal it is possible to dip in the molten glass a seal of a configuration other than a circle, for example, ellipse. Where the seal is circular the assembly 54 is moved at the same speed as its peripheral speed.

Heating of the atmosphere in which sealing operation is performed by means of a heating mechanism, such as a tunnel furnace, is extremely effective to provide satisfactory seals and to prevent damage of the article at the time of sealing. In the embodiment shown in FIG. 7 the periphery of the tank 43 is heated by the furnace 41 and such a heated region extends on both sides of the tank 43. As a consequence the sealed beam lamp 51 introduced into this heated region from the entrance of the furnace 41 will be preheated while it passes through the preheating region 49 close to the entrance whereby portions thereof to be sealed will be preheated to the desired temperature before they are brought to contact with the molten glass.

It is desirable to select the temperature of the atmosphere in the sealing region to be higher than the annealing temperature of either the glass comprising the lamp or the molten glass adapted to form the seal. This is necessary to improve adhesion of the molten glass to the seal during sealing operation and to prevent creation of internal strain in the solidified glass adhered to the seal or creation of cracks caused by such strain. More particularly, where the temperature of the atmosphere is low, because the molten glass is cooled by the contact with portions to be sealed the viscosity of the molten glass at that contact has a tendency to increase so that an excessive amount of molten glass will adhere to the seal when it is withdrawn, thus imparing the configuration of the completed seal. In addition, the electric resistance of such a cool portion of the molten glass is increased to decrease the current density flowing therethrough. Accordingly, the effect of temperature compensation provided by the heating action of current is decreased and the tendency of increasing the viscosity is promoted. Also, portions to be sealed with glass will be heated to a temperature higher than its annealing temperature by being contacted with the high temperature molten glass, and when they are rapidly cooled after removal from the molten glass, a large strain will be created between the seal and other portions. In sealing articles comprised by a material relatively free from such a strain, for example metal, the molten glass which has adhered to the seal and withdrawn upwardly from the tank will be rapidly cooled by being in contact with cool atmosphere, thus similarly creating strain therein.

On the other hand where the atmosphere is heated to an elevated temperature above the annealing temperature of either the sealing glass or molten glass, as the seal is already heated to an elevated temperature sufficient to prevent excessive decrease in the temperature of the molten glass so that the seal and the molten glass adhering thereto would not be cooled below the annealing temperature when they are withdrawn from the molten glass, thus completely eliminating all troubles caused by a large temperature difference between the seal and the molten glass.

FIGS. 9 and 10 illustrate a modification of this invention wherein a shaping mechanism is provided to control the configuration of the molten glass that has adhered to the seal. Referring to FIG. 9, a tank 61 is provided with a pair of electrodes 62 and 63 on the opposite sides thereof. One electrode 62 is connected to one terminal of the source 64 whereas the other electrode 63 to be opposite terminal of the source through a variable reactor RT. The interior of the tank 61 is filled with molten glass of the quantity sufficient to immerse electrodes 62 and 63 and an article including a circular seal is held and rotated such that the seal is dipped in the molten glass. A suitable shaping mechanism 66 is situated at a position close to the liquid surface to contact with portions of the seal of the article 65 that have passed through the molten glass. The shaping mechanism is made of an electro-conductive material such as metal and connected to the same terminal as the electrode 62.

As the article 65 is rotated, a suitable quantity of the molten glass determined by the rotational speed of the article 65 and the viscosity of the molten glass will adhere to the portions to be sealed when they pass through the molten glass. However, surplus quantity of the adhered molten glass will be removed by a sharp edge of the shaping mechanism 66. Since at this time, a voltage from the source 64 is also applied to the shaping mechanism 66, the current will flow toward the opposite electrode 63 through molten glass which comes to contact with the sharp edge of the shaping mechanism and which is not yet solidified whereby to maintain the viscosity of the molten glass adhering to the seal, thus assuring easy removal of the surplus molten liquid.

Another advantage provided by the use of the shaping mechanism is that there is no difference in the quantity of adhered molten glass between the starting point and ending point of immersion of the seal in the molten glass. For example, where the periphery of the article to be sealed is circular the sealing operation can be performed during one complete revolution of the article as above described. When the last portion of the seal has passed through the molten glass and withdrawn therefrom, the molten glass will adhere upon the previously formed glass layer to increase the thickness of that portion. Such an uneven adhesion of the molten glass can be effectively eliminated by the action of the shaping mechanism.

The above described shaping mechanism may be substituted by a suitable means that can remove surplus quantity of the molten glass adhering to the seal. Suitable heating means includes burner flames and an electric heater and these means are also effective to remove surplus molten glass and to return it into the tank.

Where the seal of an article is not circular the shaping mechanism may be moved to follow the configuration of the article. As shown in FIG. 10 when the configuration of the seal of the article 65 is square, for example, the contact position between the seal and the shaping mechanism 66 is varied as the article is rotated so that the shaping mechanism must be moved to follow this change. In FIG. 10, an electrode provided in the tank 61 and the electric circuit associated therewith are not shown, but portions corresponding to similar portions of FIG. 9 are designated by the same reference numerals. Further, where the configuration of the seal is circular the shaping mechanism is moved together with the article as the sealing operation is performed by moving the article as shown in FIG. 4.

Other modifications of this invention and variations of apparatus may be employed within the scope of the present invention.

What is claimed is:

1. A method of sealing at least two glass portions together comprising the steps of:
    preparing a mass of molten glass;
    establishing in said molten glass a path for electric current flow to heat said molten glass;
    rotating an article including said portions to be sealed together about an axis of said article such that said portions to be sealed together are successively immersed in and drawn out from said current path established in said molten glass;
    the viscosity of said molten glass being such that said molten glass will adhere to the portions to be sealed when they are immersed in and drawn out from said molten glass;
    said rotation being at a speed sufficient to allow said molten glass to adhere to said portions to be sealed so as to seal said portions together; and
    withdrawing said article from said molten glass after the desired quantity of molten glass has adhered to said portions to be sealed.

2. The method according to claim 1 further including the step of inclining the axis of rotation of said article with respect to the liquid level of said molten glass.

3. The method according to claim 1 further including the steps of moving said article and said molten glass relative to each other in a direction parallel to the liquid level of said molten glass.

4. The method according to claim 1 further including the step of heating the atmosphere surrounding the portion of said article to be dipped in said molten glass to a temperature above the annealing temperature of said molten glass.

5. The method according to claim 4 further including the steps of preheating said article to a temperature above the annealing temperature of the glass before its portions to be sealed are immersed in said molten glass and annealing said article after the molten glass has adhered to said portions to be sealed.

6. The method according to claim 1 further including the steps of removing surface molten glass adhering to the portions to be sealed by local electric heating immediately after said portions have left said molten glass.

7. A method according to claim 1 wherein said portions to be sealed together are of annular form and further including the step of rotating said portions to be sealed normal to the exposed surface of said mass of molten glass.

8. Apparatus for sealing with glass at least two portions of an article, comprising:
    a tank containing molten glass;
    at least one pair of electrodes positioned below the liquid level of said molten glass;
    means to supply electric current across said electrodes to heat at least the surface portion of said molten glass in said tank;
    means for holding said article; and
    means coupled to said holding means for rotating said article about one axis of said article to successively immerse said portions in and draw said portions out from said molten glass to thereby seal said portions together.

9. The apparatus according to claim 8 wherein said holding means includes means for moving said article in a direction parallel to the liquid level of said molten glass.

10. The apparatus according to claim 8 further including a heating furnace in which said tank is positioned.

11. The apparatus according to claim 10 wherein said heating furnace is a tunnel furnace including therein a mechanism, for moving said holding means and further including means for moving said tank in the vertical direction such that said portions to be sealed of said article are immersed in said molten glass as said article is moved through said tunnel by said holding means.

12. The apparatus according to claim 11 wherein said moving mechanism comprises rails and endless conveyors and said holding means comprises a pair of wheels which run on said rails, holding means further including means to engage said conveyors.

13. The apparatus according to claim 8 further comprising a shaping mechanism to remove surplus molten glass adhering to said portions of said article held by said holding mechanism.

14. The apparatus according to claim 13 wherein said shaping mechanism comprises an electroconductive substance electrically connected to one of said electrodes disposed in said tank.

References Cited

UNITED STATES PATENTS

| | | | |
|---|---|---|---|
| 1,618,660 | 2/1927 | Howard | 65—119 |
| 2,552,395 | 5/1951 | Borel et al. | 13—6 |

FOREIGN PATENTS

| | | |
|---|---|---|
| 569,150 | 5/1945 | Great Britain. |
| 593,866 | 3/1960 | Canada. |

S. LEON BASHORE, Primary Examiner

S. R. FRIEDMAN, Assistant Examiner

U.S. Cl. X.R.

13—6; 29—472.9; 65—43, 59, 152, 154, 155